March 29, 1938. J. W. CUNNINGHAM 2,112,521
BROILING GRID
Filed July 14, 1937
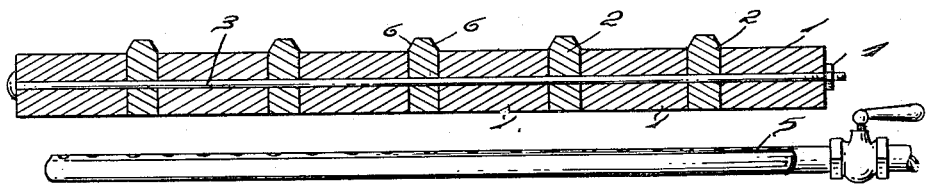
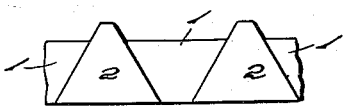
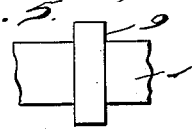
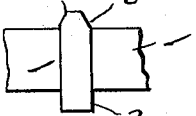
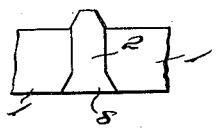
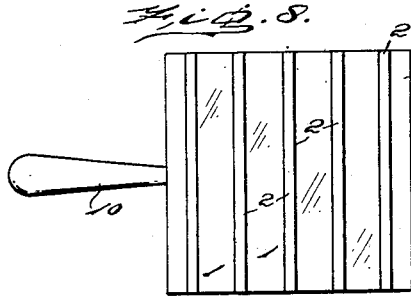
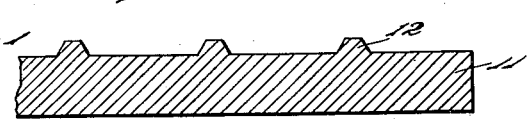
INVENTOR
James W. Cunningham
BY
Herbert S. Fairbanks
ATTORNEY Patented Mar. 29, 1938

2,112,521

UNITED STATES PATENT OFFICE 2,112,521

BROILING GRID

James W. Cunningham, Haddon Heights, N. J., assignor to Horn and Hardart Baking Co., Philadelphia, Pa., a corporation of New Jersey Application July 14, 1937, Serial No. 153,512

5 Claims. (Cl. 126—41)

My invention comprehends a novel broiler grid wherein the grid portions may have a greater heat conductivity than the rest of the cooking surface of the grid.

It further comprehends a novel grid for top cooking wherein the grid portions may be of the same or of different metal than other portions of the grid.

It further comprehends a novel grid for top cooking comprising a plate having upwardly extending, spaced grid members.

It further comprehends a novel laminated grid wherein the laminations have the same or different degrees of heat conductivity.

Other novel features of construction and adtage will hereinafter more clearly appear in the detailed description and the appended claims.

For the purpose of illustrating the invention, I have shown in the accompanying drawing typical embodiments of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a top plan view of a broiler grid, embodying my invention.

Figure 2 is a section on line 2—2 of Figure 1.

Figures 3, 4, 5, 6, and 7 are, respectively, elevations of different forms of grids embodying my invention.

Figure 8 is a top plan view of a portable grid adapted to be placed over a flame or on a conventional stove grid above a source of heat.

Figure 9 is a sectional elevation of another embodiment of my invention.

Similar numerals indicate corresponding parts.

Referring to the drawing:—

The grid may form the cooking surface of a conventional cooking range, or a portion of such surface, or it may be portable, and it may be used with any desired type of source of heat such as coal, oil, gas or electric.

The grid is made up of laminations 1 and 2 of different heat conductivity. The laminations 1 are preferably of cast iron and the laminations 2 may be of aluminum or other metal having a greater heat conductivity than cast iron.

The laminations may be secured in assembled condition in any desired manner, and for purposes of illustration I have shown headed tie rods 3 passing through them and provided with nuts 4. 5 is a source of heat, for example a gas burner above which the grid may be supported in any desired manner.

The laminations 2 of greater heat conductivity extend a desired distance above the laminations 1 to form grid members and they may extend flush with the bottom of the members 1 or beneath such bottom. The upper ends of the grid members 2 are preferably tapered or provided with upwardly converging sides as at 6, so that the meat will assume a more uniform position on the grid.

In Figures 1 and 2, the bottom of a grid forming lamination 2 is flush with the bottom of the laminations 1, while in Figure 6, the grid forming laminations 2 extend below the laminations 1, to thereby increase the degree of heat to which the laminations 2 are subjected. This effect may also be obtained by increasing the area of the base of the grid forming laminations 2. In Figure 3, the base of a lamination 2 is of increased mass as at 7 which extends below the bottom of the laminations 1, while in Figure 7, the enlarged base 8 is seated flush with the bottom of the laminations 1.

In Figure 4, the grid forming laminations have a generally triangular form with a flat top and the graduations 1 are shaped to receive them as shown.

The grid forming laminations 2 of Figure 4 may extend below the bottom of the laminations 1 in the manner shown in Figures 3 and 4.

In Figure 5, the grid forming laminations are rectangular as at 9.

It will therefore be understood that it is within the scope of this invention to have the laminations 2 of any desired contour to produce the desired grilling action and the laminations 1, shaped to receive them.

In Figure 8, the grill is shown as portable, being provided with a grasping handle 10.

With this type of grid, the steak can be properly cooked to the desired depth from both sides by the cast iron laminations 1, and the grid members 2 will cook grid marks or grooves into the steak with the walls of the grooves cooked to a greater degree than the portions between the grid marks. One is thus enabled to impart to a thinner steak, the same attractive and appetizing appearance as that of a thicker broiled steak, and to cook it to the proper degree without having it hard or over-cooked.

The laminations may be arranged in any desired manner in accordance with the cooking action desired.

In Figure 9, I have shown a broiling grid in which the body portion and the grid members are of the same metal, for example, cast iron. The grid members are spaced comparatively close together so that a steak, for example, will be supported on the grid members and is thus cooked by conductive heat at the grids and by radiant heat between the grids. Good results can be obtained if the grid members are spaced about one inch apart. The top face of the body portion 11 is a flat surface except for the raised grid portions 12.

Having thus described my invention, what I claim as new and desire to secure by Letters Patent is:—

1. A grill for top cooking having laminations of different heat conductivity, the laminations of greater heat conductivity extending above the laminations of lesser heat conductivity to form grid members.

2. A grill for top cooking having laminations of different heat conductivity, the laminations of greater heat conductivity extending above the laminations of lesser heat conductivity to form grid members of reduced thickness at their upper ends.

3. A grill for top cooking having laminations of different heat conductivity, the laminations of greater heat conductivity extending above the laminations of lesser heat conductivity to form grid members of increased mass at their lower ends.

4. A grill for top cooking having laminations of different heat conductivity, the laminations of greater heat conductivity extending above the laminations of lesser heat conductivity to form grid members, said grid members extending below the bottom of the laminations of lesser heat conductivity.

5. A cooking grid, having alternately arranged laminations of different heat conductivity, side by side in close proximity to provide a top cooking surface with the laminations of greater heat conductivity exposed at the bottom of the grid and having their upper portions extending above the top face of the laminations of lesser heat conductivity to form grid members.

JAMES W. CUNNINGHAM.